3,049,468
MANUFACTURE OF COLOURED PAPER
Anthony John Hinton and Victor Grayson Morgan, Manchester, England, assignors to Imperial Chemical Industries Limited, London, England, a corporation of Great Britain
No Drawing. Filed Dec. 15, 1958, Ser. No. 780,266
Claims priority, application Great Britain Dec. 23, 1957
7 Claims. (Cl. 162—162)

This invention relates to improvements in or relating to the manufacture of coloured paper.

According to our invention we provide a process for the manufacture of paper coloured with pigments, characterised in that the pigments are incorporated during the manufacture of the paper in conjunction with a condensation product obtainable by heating, in the absence of water, a polyalkylene polyamine with cyanamide, a derivative thereof, or a derivative of cyanocyanamide.

The polyalkylene polyamines suitable for use in the manufacture of the condensation products include those compounds of the formula:

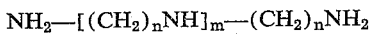

$$NH_2—[(CH_2)_nNH]_m—(CH_2)_nNH_2$$

wherein $n$ is a whole number from 1 to 6 and $m$ is a whole number greater than zero. In particular there may be mentioned as suitable polyalkylene polyamines diethylene triamine, triethylene tetramine, tetraethylene pentamine, bis-(ω-aminohexyl)amine and 1:2-bis-(ω-aminohexylamino)ethane, and polymers of ethylene imine.

Derivatives of cyanamide and cyanocyanamide suitable for use in the manufacture of the said condensation products include, in particular, phenylcyanamide, guanidine, dicyandiamide, phenyldicyandiamide, p-chlorophenyldicyandiamide, hexamethylene-bis-dicyandiamide, ethylene-bis-dicyandiamide, guanylurea, biguanide and phenylbiguanide.

Those of the derivatives that are basic, for example, guanidine, guanylurea, and biguanide, may also be conveniently used in the form of their salts with weak acids, for example with carbonic acid.

Condensation products found to be particularly well suited for the process of this invention are products prepared from the condensation of ethylene-bis-dicyandiamide and diethylene triamine.

The condensation products may be made by heating the ingredients together for example at a temperature between 70° C. and 200° C., preferably between 100° C. and 170 C., optionally in the presence of an organic diluent as is more fully described in British Patents Nos. 522,539, 657,753, 755,519 and 798,061.

All these products must be used in the form of their acid salts, and a convenient way for incorporating them is to dissolve the condensation product in water and then to make this solution slightly acid to approximately pH 4.5 by addition of acid, conveniently acetic acid. Other acids may be used, and also the condensation product may be dissolved directly in a dilute acid, if so desired.

The condensation products defined above may be used in conjunction with salts of metals, such as copper, iron, cobalt, nickel, chromium, zinc and the like, the presence of which may have, in certain instances, a beneficial effect on the process of colouration. The formation of derivatives of the condensation products with the metals mentioned above may be conveniently carried out as described in British Patent No. 755,519, or alternatively simply by mixing aqueous solutions of the condensation products with adqueous solutions of the metal salts, for example the metal acetate, chloride or sulphate.

The pigments may be incorporated, in the presence of the condensation products, at any convenient stage in the manufacture of the paper. We prefer to perform the addition at the beater stage of manufacture, so as to secure a ready mixing with the paper pulp.

The condensation products may be added either to the pigment itself so that the condensation product is present with the pigment when the pigment is added to the pulp slurry, or at any convenient stage before, during or, preferably, after the addition of the pigment of the pulp slurry in the beater. The addition of products of the type described above to the pigment itself is particularly advantageous since, in the production of unsized absorbent papers, the pigment is already in a suitable form to be retained by the fibres and no further operations, other than that of addition of the pigment to the pulp, need be made. In some instances, however, the separate addition of the pigment and the condensation product to the pulp slurry may be preferred, and if this method is adopted we find it is most convenient to add the pigment at the beginning of the beating cycle, as in normal procedure, and then to add the condensation product towards the end of the beating cycle, in time to allow sufficient and adequate admixture with the pulp before the beater contents are flushed into the machine chest, prior to being converted into the paper sheet. Excellent results are also obtained when the condensation product is added at later stages in the manufacture of the paper, for example, to the machine chests or headbox.

In the production of plastic laminates from high purity pulps, for example those comprising essentially α-cellulose, aluminium sulphate is usually added to the pulp pigment slurry to assist pigment retention without too greatly affecting the absorbency, particularly when running heavy shades. The process of our invention possesses the advantage that the specified condensation products completely replace aluminium sulphate, and at the same time produce markedly stronger, more level and, in some cases, less two-sided colouration than would be obtained if aluminium sulphate were used. A further benefit is that the acidity of the stock is less than in the case when aluminium sulphate is used, and the risk of corrosion of metal machine parts is reduced. These improvements are effected without adversely affecting the absorbency of the coloured paper finally produced and without any alteration of the operating conditions already commonly employed in the industry.

The amount of condensation product required to be added to the pulp/pigment slurry to produce pigment retentions in excess of those normally achieved by the use of aluminium sulphate and the like varies according to the condensation product and according to the pigment being employed. Thus, the amount of condensation product required may vary from 2.5 to 25% of the weight of pigment added. It is generally sufficient, however, to use between 2.5% and 5% of the preferred products.

The pigments which may be used in the process of our invention may be organic or inorganic pigments, and include insoluble azo pigments, phthalocyanine pigments, inorganic chrome and iron lakes, carbon black, and phosphomolybdic and phosphomolybdotungstic lakes of basic dyestuffs.

The invention is illustrated but not limited by the following examples in which the parts and percentages are by weight:

*Example 1*

A beater is charged with 100 parts of an air-dry bleached α-cellulose pulp and sufficient water to permit circulation, and then 20 parts of a 20% paste of the pigment obtained by coupling tetrazotised 3:3'-dichlorobenzidine with two molecular proportions of 1-phenyl-3-methyl-5-pyrazolone are added, and beating is continued until a homogeneous mixture is obtained. The condensation product obtained by heating together equimolecular proportions of ethylene-bis-dicyandiamide and diethylene triamine as described in Example 7 of British Patent No. 755,519 is mixed with copper sulphate as described in Example 13 of British Patent No. 755,519, and 0.5 part of the resulting product is added to the beater and mixed thoroughly. The resulting furnish is made into a sheet of paper.

The finished paper is considerably stronger in depth of shade than a sheet produced in a similar manner except that one part of aluminium sulphate is used in place of the 0.5 part of the condensation product in the above process.

*Example 2*

The procedure of Example 1 is repeated except that 0.5 part of a condensation product of phenylbiguanide and tetraethylenepentamine prepared as described in Example 1 of British Patent No. 798,061 and used as an aqueous solution rendered weakly acid to pH 4.5 with dilute acetic acid, is used in place of the condensation product decribed in Example 1.

The finished sheet is much stronger in colour depth than a sheet produced in a similar manner to the above process, except that 1 part of aluminium sulphate is used in place of the 0.5 part of the condensation product.

*Example 3*

A beater is charged with 100 parts of air-dry bleached α-cellulose pulp and sufficient water to permit circulation, and then 20 parts of a 12.5% paste of the pigment obtained by coupling diazotised 2-nitro-4-methylaniline with acetanilide are added, and beating continued until a homogeneous mixture is obtained. 0.5 part of a condensation product of hexamethylene-bis-dicyandiamide and tetraethylene pentamine prepared as described in Example 3 of British Patent No. 755,519, used as an aqueous solution in dilute acetic acid, is then added, and mixed thoroughly.

The depth of colour of a sheet of paper produced from this furnish is considerably superior to that produced in a similar manner except that the 0.5 part of the condensation product used in the above process is replaced by 1 part of aluminium sulphate.

*Example 4*

A beater is charged with 100 parts of air-dry, bleached α-cellulose pulp and sufficient water to permit circulation, and then 20 parts of a 20% paste of copper phthalocyanine are added and beating is continued until a homogeneous mixture is obtained. To the beater is added 1 part of the condensation product of ethylene-bis-dicyandiamide and diethylene triamine, described in Example 1, dissolved in water and acidified with dilute acetic acid, and the whole is mixed thoroughly.

A sheet of paper produced from this furnish is very much stronger in depth of shade than a sheet produced in a similar manner except that the condensation product used in the above process is replaced by an equal weight of aluminium sulphate.

*Example 5*

The procedure of Example 4 is repeated except that the 0.5 part of the condensation product of ethylene-bis-dicyandiamide and diethylene triamine is replaced by 1 part of a condensation product of guanidine carbonate and diethylene triamine. The condensation product is prepared as described in Example 8 of British Patent No. 657,573 and is used as an aqueous solution acidified to pH 4.5 with dilute acetic acid. A sheet of paper produced from this stock is much superior in colour depth to a sheet produced in a similar manner except that the condensation product in the above process is replaced by 1 part of aluminium sulphate.

*Example 6*

The procedure of Example 4 is repeated except that the 1 part of the condensation product of ethylene-bis-dicyandiamide and diethylene triamine is replaced by 3 parts of a condensation product of dicyandiamide and tetraethylene pentamine, prepared as described in the Example in British Patent 522,539 and used in the form of an aqueous solution rendered weakly acid with acetic acid.

The depth of colour of a sheet made from this furnish is much superior to that of a sheet produced from a similar stock except that 3 parts of aluminium sulphate are used in place of the 3 parts of the condensation product used in the above process. A similar improvement is obtained if an amount of copper chloride equal to 50% of the weight of condensation product is mixed with the condensation product before use.

*Example 7*

A beater is charged with 100 parts of air-dry, bleached α-cellulose pulp and sufficient water to permit circulation, and 20 parts of a 15% paste of the product obtained by coupling diazotised 4-chloro-2-methyl aniline with 2-hydroxy-3-naphthoic-4'-chloro-2'-methylanilide are added and beating is continued until a homogeneous mixture is obtained. 1 part of a water soluble condensation product of ethylene-bis-dicyandiamide and tetraethylene pentamine, prepared as described in Example 1 of British Patent No. 755,519 and used in the form of a weakly acid solution, is added and mixed thoroughly.

A sheet produced from this furnish is deeper in colour than a sheet produced in a similar manner except that 1 part of aluminium sulphate is used in place of the condensation product in the above process.

*Example 8*

The procedure of Example 7 is repeated except that the condensation product of ethylene-bis-dicyandiamide is replaced by 1 part of a condensation product formed from dicyandiamide and tetraethylene pentamine, prepared as described in Example 2 of British Patent No. 657,753 and used in the form of a weakly acid solution.

Similar results are obtained to those described in Example 7.

*Example 9*

The procedure of Example 7 is repeated except that the condensation product of ethylene-bis-dicyandiamide is replaced by 1 part of a condensation product of p-chlorophenyldicyandiamide and tetraethylene pentamine, prepared as described in Example 2 of British Patent No. 755,519 and used as a solution in dilute aqueous acetic acid.

Similar results to those described in Example 7 are obtained.

*Example 10*

The procedure of Example 7 is repeated except that the condensation product of ethylene-bis-dicyandiamide is replaced by 1 part of a condensation product of phenyldicyandiamide and tetraethylene pentamine, prepared as described in Example 4 of British Patent No. 755,519 and used as a solution in dilute aqueous acetic acid.

The results obtained are similar to those described in Example 7.

What we claim is:

1. A process for the preparation of paper colored with water-insoluble pigment which comprises incorporating in the paper during the manufacture thereof said pigment and about 2.5 to 25% by weight of the pigment of an acid salt of a water-soluble condensation product obtained by heating to 70–200° C. under anhydrous conditions, a polyalkylene polyamine having the formula $$NH_2[\!-\!(CH_2)_nNH]_m\!-\!(CH_2)_nNH_2$$

in which $n$ is a whole number between 1 and 6 and $m$ is a whole number greater than zero with a compound selected from the group consisting of cyanamide, phenylcyanamide, guanidine, dicyandiamide, phenyldicyanadiamide, p-chlorophenyldicyanadiamide, hexamethylene-bis-dicyandiamide, ethylene-bis-dicyandiamide, guanylurea, biguanide, phenylbiguanide, and weak acid salts of guanidine, guanylurea and biguanide.

2. A process according to claim 1 in which the amount of said condensation product is between about 2.5 and 5% by weight of the pigment.

3. A process according to claim 1 wherein the pigment and condensation product are added to a paper pulp slurry.

4. A process according to claim 1 wherein said temperature is between 100° and 170° C.

5. Process according to claim 1 wherein the polyalkylene polyamine is selected from the group consisting of diethylene triamine, triethylene tetramine, tetraethylene pentamine, bis-($\omega$-aminohexyl)amine, 1:2-bis-($\omega$-aminohexylamino)ethane and polymers of ethylene imine.

6. A process according to claim 1 wherein the condensation product is used with a metal salt.

7. A process according to claim 6 in which said salt is selected from the group consisting of salts of copper, iron, cobalt, nickel, chromium and zinc.

References Cited in the file of this patent

UNITED STATES PATENTS

| | | |
|---|---|---|
| 2,492,702 | Neubert et al. | Dec. 27, 1949 |
| 2,622,075 | Hemmi et al. | Dec. 16, 1952 |
| 2,730,446 | Hutchins | Jan. 10, 1956 |
| 2,834,675 | Jen et al. | May 13, 1958 |
| 2,838,425 | Lutz et al. | June 10, 1958 |
| 2,883,304 | Kine | Apr. 21, 1959 |
| 2,885,318 | Jen et al. | May 5, 1959 |
| 2,897,162 | Lowe | July 28, 1959 |
| 2,912,296 | Taube et al. | Nov. 10, 1959 |
| 2,969,302 | Green | Jan. 24, 1961 |

FOREIGN PATENTS

| | | |
|---|---|---|
| 522,539 | Great Britain | June 20, 1940 |